F. JUDSON.
FARM TRACTOR.
APPLICATION FILED NOV. 29, 1919.
1,386,874.
Patented Aug. 9, 1921.
5 SHEETS—SHEET 4.
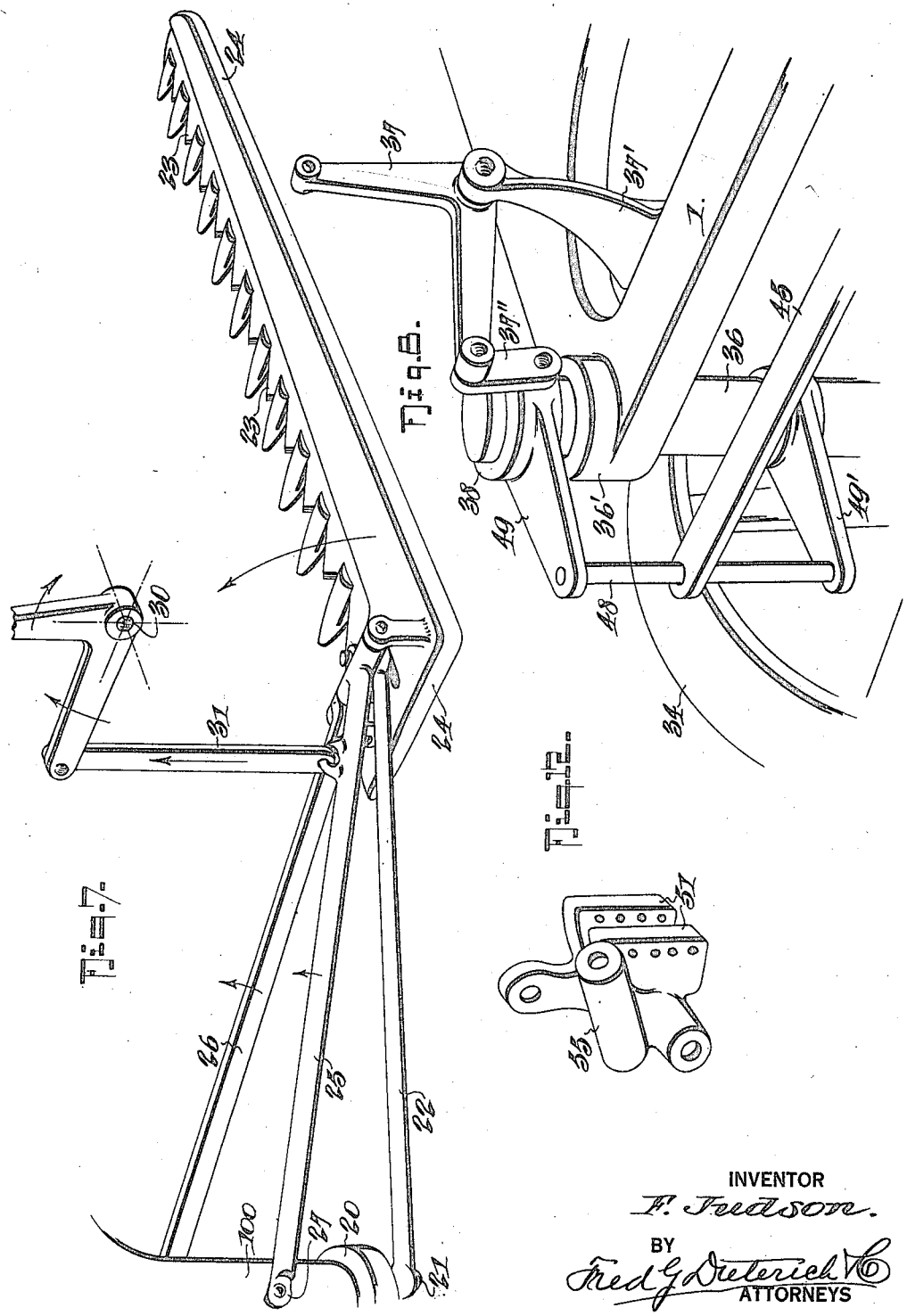
INVENTOR
F. Judson.
BY
Fred G. Dieterich
ATTORNEYS F. JUDSON.
FARM TRACTOR.
APPLICATION FILED NOV. 29, 1919.
1,386,874.
Patented Aug. 9, 1921.
5 SHEETS—SHEET 5.
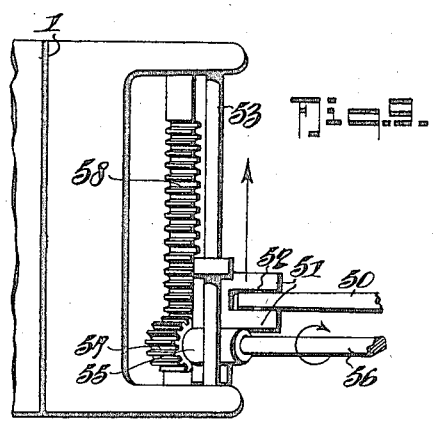
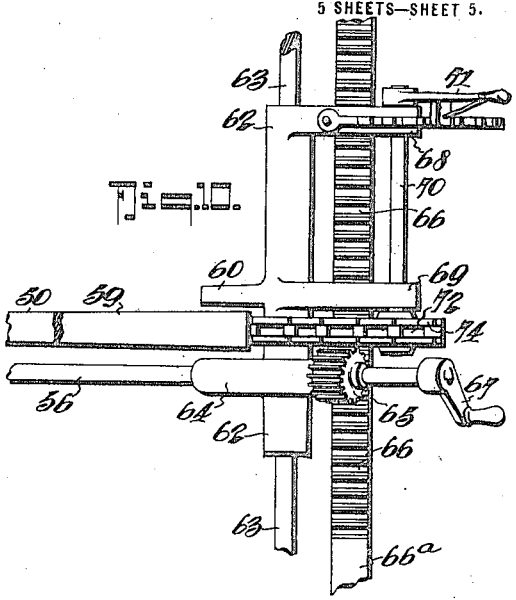
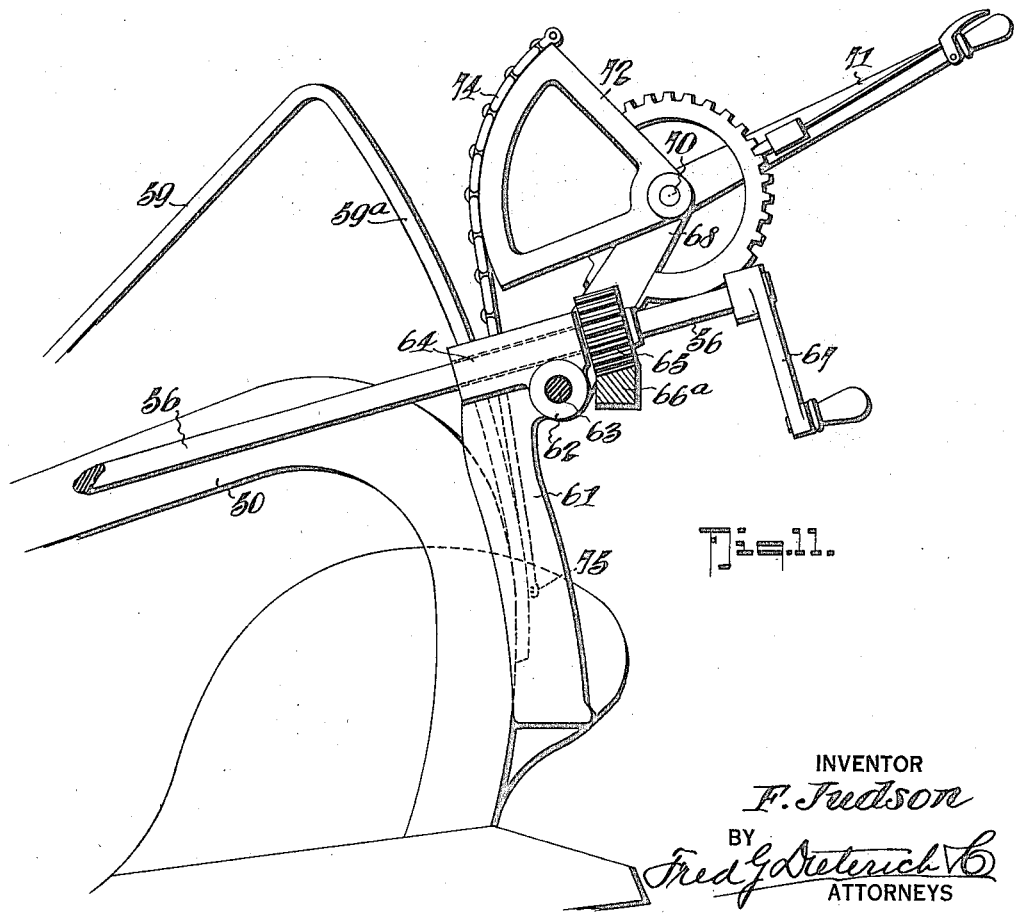
INVENTOR
F. Judson
BY
Fred G. Dieterich
ATTORNEYS

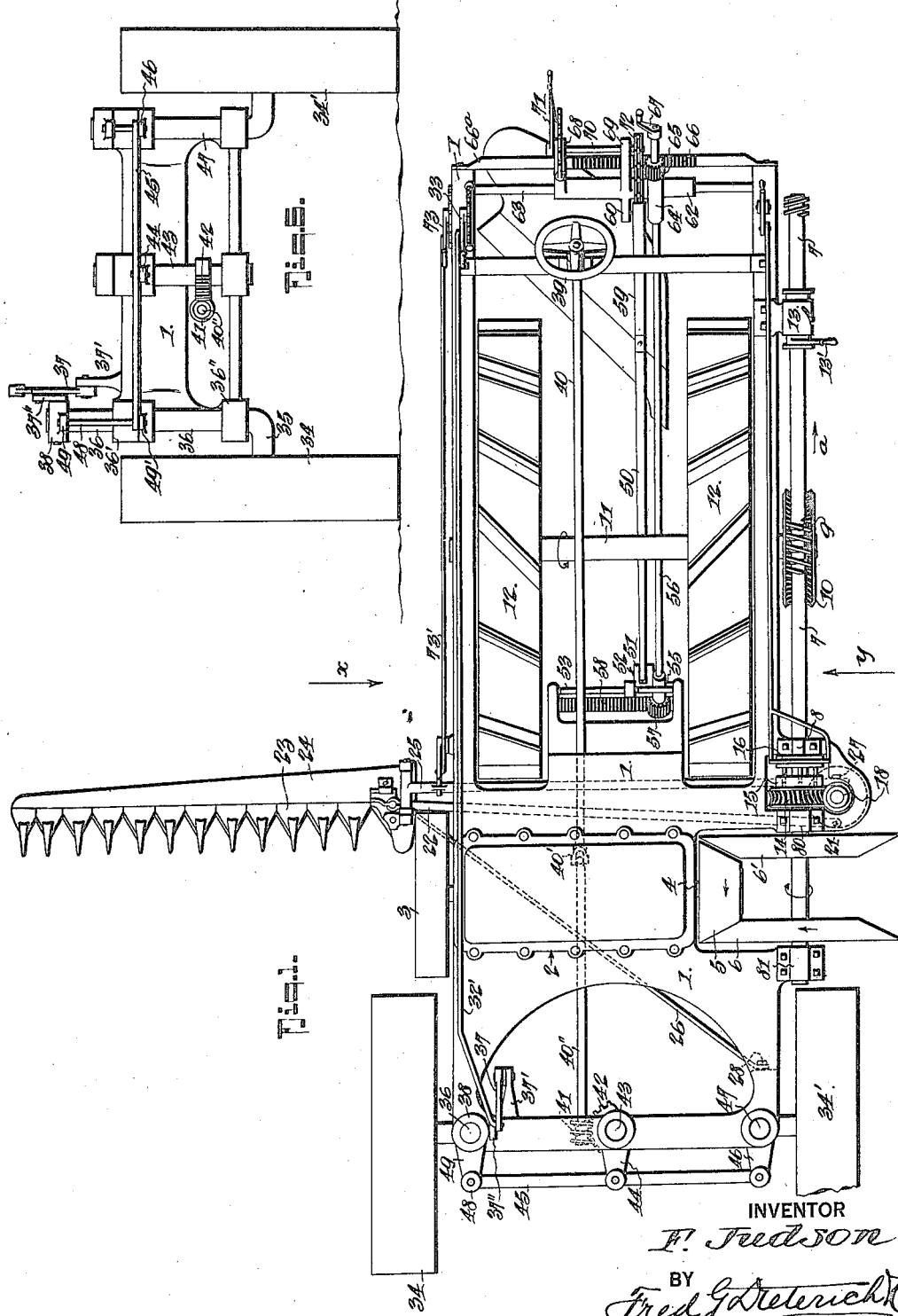

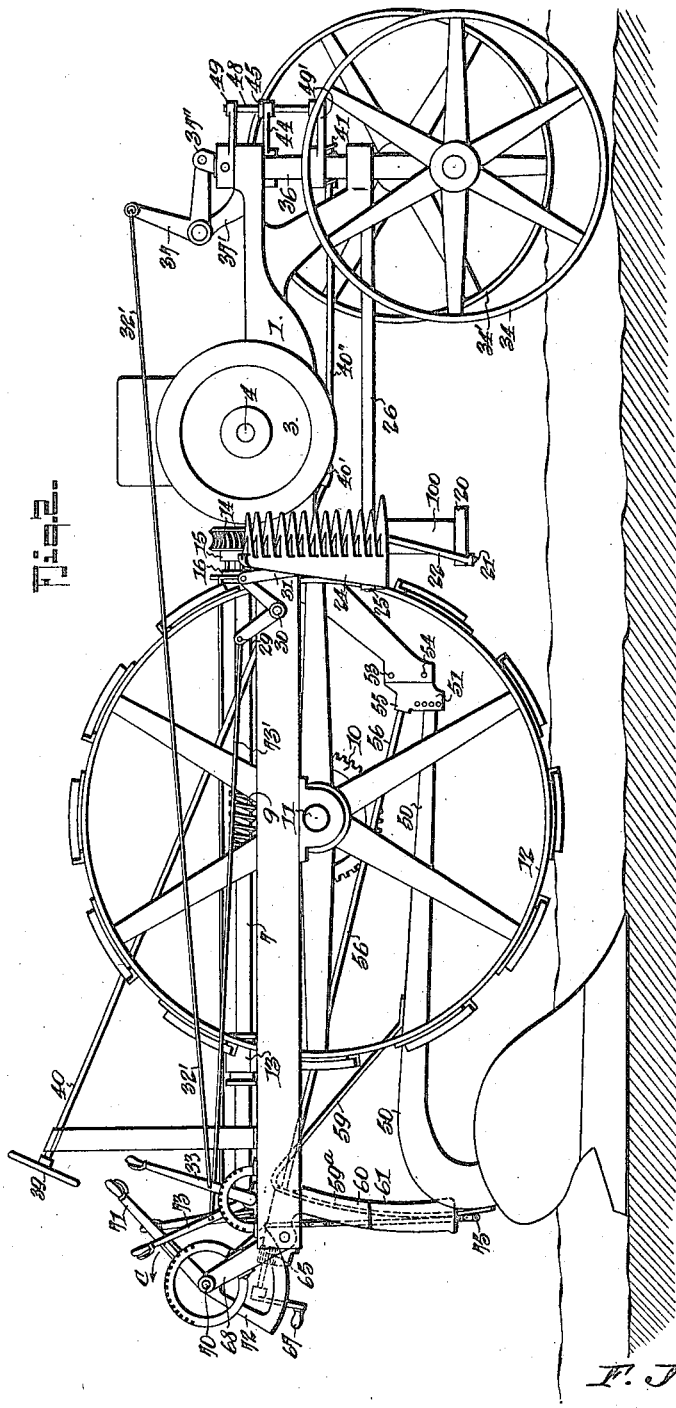

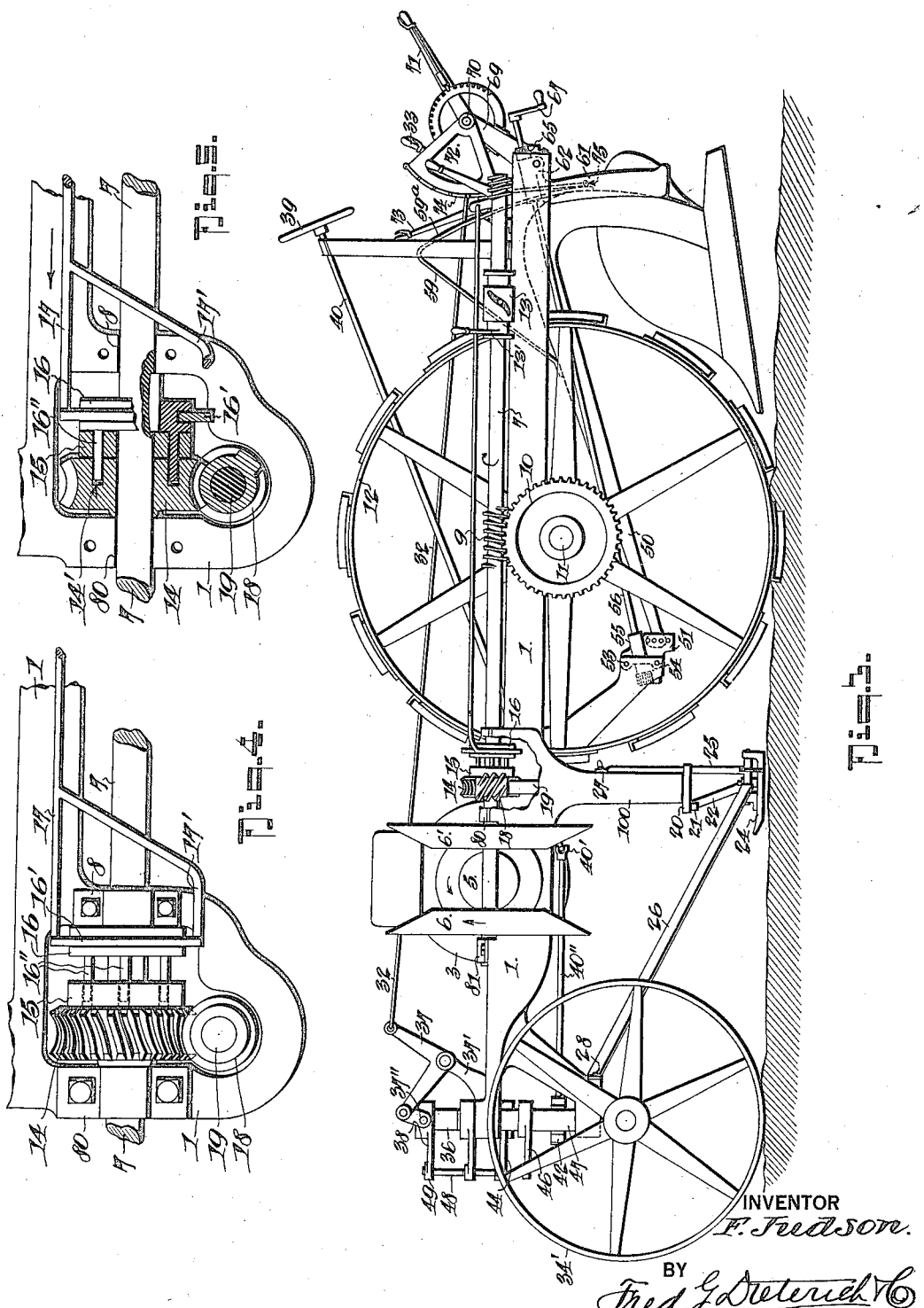

UNITED STATES PATENT OFFICE.

FRED JUDSON, OF FULLERTON, NEBRASKA.

FARM-TRACTOR.

1,386,874. Specification of Letters Patent. Patented Aug. 9, 1921.

Application filed November 29, 1919. Serial No. 341,355.

*To all whom it may concern:*

Be it known that I, FRED JUDSON, a citizen of the United States, residing at Fullerton, in the county of Nance and State of Nebraska, have invented certain new and useful Improvements in Farm-Tractors, of which the following is a specification.

This invention has reference to tractor driven agricultural machines and primarily it has for its purpose to produce a farm tractor in which the arrangement of the parts thereof is such that the machine will be adapted to do the greatest possible work on a farm and which, in its complete make-up, consists of a minimum number of parts, so designed and compactly arranged, whereby to practically eliminate all loss of power through friction and adapted for such adjustments, whereby the said tractor can be, with but little adjustment, readily utilized as the propelling means for the several different machines generally used on a farm.

Another object of my invention is to provide an improved construction of farm tractor that includes different mechanisms, the plowing, mowing, stalk cutting and other cultivating appliances or attachments, and in such manner that the individual mechanisms become as interdependent operative parts of the tractor, and adapted for being operated direct from the tractor transmission, and the said mechanisms, when combined with the tractor elements, may be handled with greater ease and accuracy than has been possible in the use of the common forms of tractor operated machines of the general character stated and heretofore provided.

With other objects in view, that will hereinafter appear, my invention is an improved farm tractor that embodies the peculiar arrangement and combination of parts fully stated in the following detailed explanation, specifically set out in the appended claims and illustrated in the accompanying drawings, in which:

Figure 1 is a plan view of my improved construction of tractor, the parts being adjusted for plowing, the secondary or mowing attachments being also shown, the latter being indicated at the inoperative or elevated position.

Fig. 2 is a side elevation of the tractor arranged as a plowing machine, looking in the direction of the arrow $x$ on Fig. 1, the plow being shown at the lowered adjustment.

Fig. 3 is a side view looking in the opposite direction to Fig. 2 and as indicated by the arrow $y$, the plow being shown in the elevated position, the mowing elements being indicated at the lowered or operative position.

Fig. 4 is a plan view, on a somewhat enlarged scale, and it illustrates the shiftable clutch devices that connect the power transmission shaft and the mower actuating shaft driven from the said power shaft.

Fig. 5 is a view somewhat similar to Fig. 4 and it illustrates the said parts as adjusted to disconnect the power shaft and the mower actuating shaft.

Fig. 6 is a front elevation that illustrates the arrangement of the front or steering wheels and the means for adjusting the furrow wheel.

Fig. 7 is a detail perspective view of the pivotal connection for the sickle bar.

Fig. 8 is a detail perspective view of the furrow wheel raising and lowering devices.

Figs. 9 and 10 are detail plan views of the lower and upper portions of the means for shifting the plow laterally.

Fig. 11 is a detail side elevation of the means for effecting the raising and lowering of the plow.

Fig. 12 is a detail perspective view of the clevis connection hereinafter referred to.

In designing a tractor, such as shown in the drawings and hereinafter described, and in which it is desired to combine several different machines, and to have each machine worked as satisfactorily as though the tractor had been designed for that particular machine, it is important that the body and the wheels on which the tractor and its cooperative elements are mounted, be so arranged, that they can in no way interfere with any of the parts of the different machines attached to the tractor structure, and at the same time, the tractor and its cooperating transmission mechanism should be so arranged that they will coact with any combination of attached machines and to the best possible advantage.

To provide for the aforesaid conditions, I have designed a tractor structure that includes a special arrangement of the body and the wheels on which the body is mounted, combined with an improved arrangement of transmission mechanism in which is embodied fewer parts than are contained in the common types of tractor driven mowers, and in which the coöperative connections of the parts that constitute my improved transmission mechanism, are so combined that end thrusts on the driving shafts are substantially eliminated without interfering with the availability of the transmission for use in connection with mechanisms other than mowing devices, such as cotton drills, corn planters, grain drills &c., the tractor construction, *per se*, being of such design as to allow for combining with it and the transmission mechanism, the following farm implements, a plow, a lister, a cultivator &c., each of which, when individually attached to the tractor, becomes as an integral part of the complete tractor driven machine.

In carrying out my invention, I construct a tractor frame that comprises a main body 1, in practice of a single steel casting, that has its forward end suitably shaped to constitute the lower part of the crank case for the engine, as indicated by 2.

The other part of the crank case is bolted direct to the body of the tractor, insuring permanent alinement of the motor engine and the transmission mechanism presently again referred to.

By referring now more particularly to Fig. 1, it will be noticed, the engine crank shaft 4 carries the usual fly wheel equipment 3, at one end, and the opposite end is provided with a beveled friction gear 5, the latter being adapted for coöperation with either of a pair of metal friction beveled gear wheels 6 and 6'.

A power transmission shaft 7 is journaled at the forward end in bearings 8 and 80 and at the front end in a bearing 81, the said several bearings 8, 80 and 81 being integral portions of the main body casting.

Suitably located and along its length, the shaft carries a worm gear 9 that meshes with a worm gear 10, which is keyed or otherwise made fast to the axle 11, on which the tractor driving wheels 12 are mounted, to turn therewith.

At the rear end, the shaft 7 is provided with a thrust box 13 and lever 13', such as are in common use for imparting a longitudinal back and forth shifting of the said transmission shaft 7 to bring either of the friction gears 6 or 6' in position for transmitting movement to the tractors 12—12 in the desired direction, it being clear from Fig. 1 that by shifting the shaft 7 back in the direction of the arrow $a$, it brings the metal beveled gear 6 into frictional engagement with the beveled wheel 5, and when the gears 5 and 6 are thus adjusted assuming the engine to be in motion, gears 5 and 6 will turn in the directions indicated by the arrows and through the shaft 7 and worm gears 9 and 10 impart a forward rotation to the tractor or driven wheels 12—12.

By coupling the axle 11, that carries the drivers 12—12, with the main transmission shaft 7, as described, as the worm 9 begins pulling on the worm gear 10, it produces an end thrust of the shaft 7, causing it to straighten in the rearward direction, see the arrow $a$ and the result is that the metal friction wheel 6 is drawn more tightly against the fiber beveled disk 5, it being obvious the greater the end thrust on the shaft 7, as stated, the tighter will become the friction contact between the driver gear 5 and the beveled or gear wheel 6.

It should be here stated that from practical experience, it has been demonstrated that the pull between the worm 9 and the friction wheel or driver 5 is so evenly balanced that, just enough pressure placed on the thrust lever 13', to cause the friction wheel 6 to turn, when there is no load attached to the tactor, is sufficient to maintain contact between the friction wheels, when the tractor is loaded to its capacity.

In the arrangement of the parts just mentioned, the end thrust required to maintain contact between the friction wheels 5, 6 and 6', and the end thrust resulting from use of a worm and worm gear, counteract with each other and disappear entirely, so far as the ends of the shaft 7 are concerned.

So far as described, it will be noticed that the transmission is carried direct from the engine to the drive or tractor wheels 12—12, through four transmission gears and one shaft arranged and coöperatively so connected that all end thrust on the shaft 7 resultant from the use of the friction and worm drive connections is practically eliminated, and with said transmission adapted for being readily utilized to operate a mower, a planter, a lister and other cultivating mechanisms or attachments, in a simple and economical manner and as hereinafter further explained.

Referring now more particularly to Figs. 1 and 2, which illustrate my invention as a tractor plow, it being understood that, when thus arranged, the mower mechanism, shown as an attached part of the complete tractor mechanism as illustrated, is adjusted (that is lifted up) to the inoperative position as further specifically stated, or the said mower mechanism, other than the transmission connections provided for coupling the said mower mechanism with the main transmission shaft 7, may be entirely omitted.

It is understood that, when my construction of tractor is utilized as a riding plow, especially shown in Figs. 1, 2 and 3, the right front wheel 34 must run in the furrow while the left front wheel 34' and the tractor or drive wheels 12—12 run on the land.

The furrow wheel 34 is mounted on a stub axle 35 bent laterally from the lower end of a vertical shaft 36 which is mounted in an upper bearing 36' that is an integral part of the front of the bed or body 1, and a bracket bearing 36" pendently attached to or integral with said body 1.

Shaft 36 is vertically movable in its bearings and for conveniently adjusting the said shaft 36, up or down, as conditions may make necessary, I employ a bell crank lever 37 that is pivotally mounted on a bracket 37' (a part of the body 1) and the said lever 37 has one end pivotally connected to a link 37" in turn pivotally joined with a collar 38 mounted on the upper end of the shaft 36, as shown.

A rod 32' is pivotally connected to the upper or outer end of the lever 37 extends rearwardly and joins with a control lever 33 attached to one side of the frame 1, it being understood that by raising or lowering of the lever 33, the shaft 36, through the connections described, is raised or lowered to set the forward wheel 34, high or low, as may be desired.

Shaft 36 is also arranged for being readily rotated or turned in its bearings to the right or left, as it is being raised or lowered to allow the tractor to be steered while the wheel 34 is in the furrow as well as when out of it, as will presently be further explained.

For steering the tractor, I provide a steering wheel 39, suitably located at the rear end of the tractor frame and mounted on the rear end of the steering rod 40 whose forward or lower end joins, through a knuckle connection 40', with a horizontal steering rod member 40" provided at the outer end with a worm gear 41 which meshes with a sector 42 on the lower end of a short vertical shaft 43, that is suitably mounted in bearings on the bed or body frame 1.

44 designates a crank arm keyed to the shaft 43 and it connects with a rod 45 that extends across the front end of the frame 1 and which has one end pivotally connected to an arm 46 that is keyed on and extends horizontally forward from the vertical shaft 47 upon which the left hand front wheel 34' is mounted.

The opposite or right hand end of the rod 45 is slidably attached to a vertical rod 48 mounted in the upper and lower arms 49 and 49' attached to and vertically movable with the said shaft 36, as is best shown in Fig. 6.

The necessity for raising and lowering the front wheel 34 will be better understood when it is explained how the plow is mounted on the tractor so as to make a perfect riding plow, in which the plow has all the advantages of a full floating hitch combined with a slidably mounted hitch that allows for cutting a furrow of any desired width and which is also so arranged that the width of the furrow can be quickly and easily provided for while the plow is in motion and without removing the plow from the ground.

It should be here mentioned, the efficiency of my tractor, when used as a riding plow, is dependent on the combined floating and sliding hitch connections, since my said tractor has only one speed forward.

It should be here mentioned, that it is customary in tractors as at present provided, when steep hills are to be plowed, to use the tractor with a very low speed for such work, while using a normal speed for average or level ground work.

Since the combined friction and worm drive in my construction of tractor does not admit of more than one speed, I use a speed that is best adapted to most of the work to be done on the farm, such as mowing, cultivating, harrowing, seeding &c., and plowing, under average conditions, and when uphill plowing is encountered, the tractor proceeds at its regular speed, as the plow is adjusted to cut a furrow of any desired width, while the depth of the furrow is not changed.

This arrangement has great advantage over a two speed tractor, for the reason, that by regulating the width of the furrow, it is possible to give the tractor the full amount of work it is capable of handling, according to the steepness of the hill, while a two speed tractor will waste considerable time on low grades that cannot quite be taken on high speed, and, consequently the tractor must travel at a speed much slower than is necessary.

Furthermore, a plow will not scour well at low speeds.

In order to obtain the above mentioned results, my arrangement of the tractor wheels is an important part of the combination, for without the special arrangement of the parts, my sliding and floating hitch could not be used, it being understood that the front wheel 34 acts as a guide wheel, when the steering means is slightly adjusted so as to turn it, (the wheel 34) to engage with the land side of the furrow.

Thus, in my arrangement of the tractor wheels, combined with the plow, the furrow wheel 34 always coacts with the land side of the furrow regardless of what width furrow the plow is cutting, and the drive wheel 12—12 that run on the land side at a predetermined distance from the furrow, will always retain the said distance from the furrow regardless of the width of the furrow.

The drive wheels 12—12 being both keyed on the one shaft 11 act, as it were, as one wheel, as the plow is mounted between said wheels.

Referring now to the plow hitch devices, the plow beam 50 is attached to a clevis 51 by a pin 52, see Figs. 1, 2 and 9, and the said clevis 51 is slidably adjustable, laterally, on two rods, an upper one 53 and a lower one 54.

55 designates a bearing connected to or an integral part of the clevis 51, through which the front end of a rod 56 passes.

A spur gear 57 on the aforesaid front end of the rod 56 engages a transversely disposed horizontal rack 58 in such manner that rotation is imparted to the rod 56, as further presently described, since the gear 57 acting on the rack 58, will cause the clevis 51 to slide along the rods 53—54, laterally, in the desired direction.

At the rear end, the plow beam 50 is provided with an upright guiding bracket 59, which includes an arched-shaped member 59$^a$ which, when the plow is raised and lowered, rides up or down between guiding flanges 60—61 of a slidable hoist 62 and in such manner as to hold the plow in an upright position and from lateral motion during the operation of raising or lowering the said plow.

Flanges 60 and 61 constitute an integral part of the casting (hereinafter termed the slidable hoist 62) and the said casting is mounted, for lateral movement, on a cross rod or shaft 63 supported at the ends in the opposite side beams of the bed or body of the tractor frame, as is clearly shown in Fig. 1.

The hoist casting 62 includes a bearing 64 through which the upper end of the rod 56 passes and whose lower end passes to the clevis 51, as before stated.

The upper end of rod 56 extends beyond the bearing 64, and at said end, it carries a spur gear 65 that is held in mesh with a rack portion 66 formed on a transverse bar 66$^a$ secured at its opposite ends to the rear ends of the slide beam of the bed 1, as is clearly shown in Figs. 1, 2 and 3.

67 designates a crank lever or handle on the rear end of the rod 56.

By reason of the peculiar arrangement of the parts that constitute the floating hitch or clevis connections and the hoist devices combined with the plow as described and shown, when the crank lever 67 is turned over, it causes the gears 57 and 65 to move along their respective engaging racks 58 and 66 and thereby slidably carries the clevis 51 and the hoist 62, the clevis along its supporting rods 53 and 54 and the hoist 62 along the shaft or cross rod 63, it being readily understood, by referring to the drawings, that the lateral movement of the plow, which moves with the clevis 51 and the hoist 62 can take place, when the plow is in or out of the ground.

The raising or lowering of the plow is best explained as follows:

On the hoist casting 62 are two rearwardly projecting arms 68—69 and in boxings in the ends of the arms, is mounted a cross shaft 70 provided at one end with a lever 71. At the other end, the shaft 70 carries a pulley segment 72 and to the inner end of this segment 72 is secured the upper end of a lift chain 74, the lower end of which connects to the segment bracket 59 at the point 75, see Fig. 3.

When the lever 71 is swung back in the direction of the arrow $c$, it is evident that the lift chain will elevate the plow to any desired height where it can be retained by the usual rack and pawl connections as indicated.

By connecting the plow to the tractor body or frame, through hoist mechanism, as shown and described, the said plow is free for being moved up while it is in the ground and it should be stated, such adjustment of the plow is necessary when it is attached to a rigid body like a tractor.

In my construction, the plow cannot go deeper than the limit provided by the chain 74, though the depth adjustment is regulated by the lever 71 and the hoist is prevented from tipping or rocking on the shaft 63 by the rod 56 that passes through the long bearing 64.

A further important feature of the plow hitch heretofore described, is, that it can be made to impart additional traction to the drive wheels 12—12, when so desired, and this is accomplished by lowering the front end of the plow beam in the clevis connection 51 to thereby cause the plow to penetrate at a steeper angle of contact, which tends to run the plow deeper into the ground. As the chain 74 prevents the plow going deeper than the tractor wheels will admit, it is obvious that there will result a constant downward pull on the chain 74, as the plow is moving forward in the ground and the said downward pull is converted into additional traction in the drive wheels 12—12.

The advantage of this feature of my invention will be apparent when it is stated that from practical observation, it has been estimated that forty per cent. of the force required to pull a plow is expended in cutting the furrow slices, while sixty per cent. of the force is expended lifting and turning the furrow slices.

Another advantage developed in the peculiar construction and arrangement of the parts that constitute the plow mount and plow adjusting means, is, that it is possible to add a very considerable amount of traction to the drive wheels by compelling them to carry the load caused by raising the furrow slices and further, because of the added traction obtained, the dead weight of the tractor is gradually reduced with still enough traction remaining for the hardest job which the tractor will be called on to do, that of plowing.

The additional tractor feature just explained is made possible by the peculiar arrangement of the tractor wheels best shown in Fig. 1 and which is explained as follows:

By referring to Fig. 1, it will be observed that while the plow beam is laterally adjustable to either side, as before stated, under normal plowing, it is placed midway of the two drive wheels 12—12 and, when thus placed, produces a balanced pull on the side with no side draft.

When thus placed, the plow operates to cut and turn the strip of land that lies between the center of the tractor and the inside of the furrow wheel 34, the several wheels being spaced to make such result possible.

Now while both wheels 12—12 are keyed to one shaft 11 and may be considered as one wheel, divided for the purpose of mounting the plow in the center of the tractor, it allows the plow to be advanced as far forward as possible to facilitate the turning of the tractor while the plow is in the ground.

It will be observed, by referring to Fig. 3, the plow beam has about the same relation to the tractor wheels 12—12 that a plow beam usually has to the wheels in a sulky plow and that the tractor will be able to plow around curves as well as a riding plow can.

My tractor construction, *per se*, is of such design that it provides for combining with it a transmission mechanism that is especially adapted for being held in active connection with the motor power driven gear and for transmitting the motor power to a plurality of shafts, each adapted for independently operating a special mechanism and both operable in unison.

In the drawings, one of the driven shafts is arranged as the tractor wheels driver and the other is utilized for imparting motion to a ground working mechanism, for example a mower mechanism, as is best illustrated in Figs. 1 and 3 of the drawings.

In the practical showing of my farm tractor, the same includes a plurality of soil working mechanisms, each arranged for being adjusted out of an operative position, as the other of the said mechanisms is in the operative position and the transmission mechanism that constitutes a part of my complete construction of farm tractor, is so arranged that at all times the same power transmission is utilized for driving the tractor to provide the necessary draft for one of the soil working mechanisms, plow, and also to provide for transmitting the motive power for operating the other soil working mechanism, which, as shown in the drawings, may be a mowing mechanism, the construction of the parts of which is explained as follows:

14 designates a worm gear that is loosely mounted on the shaft 7 and 15 denotes a collar, also loosely mounted on the said shaft 7, and 16 is another collar also spline attached on the shaft 7.

Collar 16 has a number of rigidly attached pins 16″, preferably four, that project through a like number of apertures, drilled through the collar 15 and into registering apertures in the worm gear 14.

Collar 16 has an annular groove in which is received a ring 16′ to which is attached a pair of rods 17—17′, as is clearly shown in detail in Figs. 4 and 5.

The several parts mentioned constitute the main drive clutch device for connecting the main drive shaft 7 with a transmission shaft 19, through which the sickle devices of the mower are connected, as will be presently further stated, it being obvious that by pushing the rods 17 and 17′ forward, they cause the collar 16 to slide forward on the shaft 7 and thereby cause the clutch pins 16″ to move in the sockets 14′ in the gear 14 and lock the said gear to turn with the collar 16 spline connected on the shaft 7.

The gear 14 meshes with a worm pinion 18 on the upper end of the transmission shaft 19 and through a balance disk or wheel 20, attached to the lower end of said shaft 19, transmits motion, through a crank or wrist pin connection 21, to a pitman rod 22 attached to the connection for imparting the desired reciprocation to the sickle bar of the mower, from the rotation of the shaft 19, the latter being securely sustained in a long bearing 100, see Fig. 2, pendent from the bed of the tractor frame.

The pitman rod 22 stated extends across from the transmission or land side of the tractor frame to the furrow side and connects with the sickle 23, the latter being mounted upon and contained in a sickle bar 24 in the usual manner.

In my arrangement, the sickle bar 24 is attached to the tractor by two coupling bars 25—26 and these bars are hinged at their points of contact with the body of the tractor, as indicated by 27 and 28 (see Fig. 1), such connection being provided to admit of raising and lowering the sickle bar and guard points to be tilted up or down, by proper manipulation of the lever 73, the latter being joined with the brace rod 25 by bell crank connections 29, 30 and 31, see Figs. 1 and 2.

In operation the mower attachments work in the following manner:

When the pin clutch devices 15, 16 and 16″ couple the gear 14 to the shaft 7 and when the tractor is moving, the shaft 7 is rotated and imparts, through the gears 14 and 18, rotation to the upright shaft 19, through which the pitman rod 22 is reciprocated to impart the desired movements to the sickle.

By reason of the manner in which the mower attachments are connected with the tractor, a simple and effective means is provided for obtaining the practical results desired with the fewest possible parts, in the transmission as well as in the machine as a whole, thereby allowing for handling the machine in the field with ease and with the sickle attached, as shown, it can go closer in corners of a field than can a mower drawn by horses and can also turn corners very much shorter than is possible with a mower drawn behind a tractor.

Another and essential advantage obtained in my arrangement of tractor and its adaptation for attaching the mower mechanism therefor, as stated, is, that it eliminates end thrusts on two transmission shafts, explained as follows:

The worm gear 14 has a tendency to pull the shaft 7 rearward, see arrow $a$, which action assists the worm gear in pulling the friction wheels 5 and 6 into firmer contact and at the same time, the gear 14 has a tendency to raise the pinion 18 and the vertical shaft 19, the lift just about balancing the weight of the said shaft 19, the pinion 18, the disk 20 and the beam 22 attached to the said shaft.

The advantage in the arrangement of the parts just stated is apparent, when it is considered that were it not for the lifting effect of the worm gear 14, the weight of shaft 19 would have to be carried by a thrust bar.

I make no claim in this application for the plow lifting devices and the means for adjusting the plow mechanism laterally or for the specific form of follower wheel adjusting devices.

From the foregoing description taken in connection with the accompanying drawings, the complete arrangement of the parts confined in my construction of farm tractor, the manner in which the said parts may be adjusted to suit the different requirements for a tractor of this kind, and the advantages, further than those hereinbefore stated, will be readily apparent to those familiar with the use of farm machinery.

While the drawings illustrate an operative arrangement of parts, it is to be understood that the details of construction may be readily modified and changed to suit the specific requirements for attaching machine elements, other than those described and shown, without departing from the spirit of my invention and as comes within the scope of the appended claims.

What I claim is:

1. In a farm tractor, a bed frame, a motor thereon, a motor driven shaft with which the said wheels rotate, power transmission connecting the motor and the traction wheel shaft, the said mechanism including a lengthwise shiftable shaft mounted on the bed frame, gears adapted for engagement with the motor shaft for causing the driving action of the motor upon the shiftable shaft to be either forward or backward, and thrust lever devices connecting the frame and the longitudinally movable shaft for shifting the gear connections that join the said shiftable shaft and the motor shaft.

2. In a farm tractor, a bed frame, a motor thereon, a pair of spaced traction wheels, a motor driven shaft with which the said wheels rotate, power transmission connecting the motor and the traction wheel shaft, the said transmission including a lengthwise shiftable shaft mounted on the bed frame, gears adapted for engagement with the motor shaft for causing the driving action of the motor upon the shiftable shaft to be either forward or backward, and gear connections that join the said shiftable shaft and the tractor wheels driving shaft, for constantly applying end thrust to the shiftable shaft, in either direction, according to the direction of motion of the tractor.

3. In a farm tractor, a bed frame, a motor thereon, a tractor wheel, a driven shaft that rotates with the wheel, a second driven shaft mounted on the frame, a driving gear on the shaft, power transmission connecting the motor and the aforesaid driven shafts, the said transmission including a lengthwise shiftable shaft mounted on the frame, gear connections that join the said shiftable shaft and the tractor wheel driven shaft, and clutch devices on the said lengthwise shiftable shaft for coupling up the gear on the second driven shaft with the said longitudinally shiftable shaft.

4. In a farm tractor, a bed frame, a motor thereon, a tractor wheel, a driving shaft for the said wheel, a second driving shaft mounted on the frame, power transmission connecting the motor shaft with the aforesaid driving shafts, a reciprocable member sustained upon the frame, the said power transmission including a lengthwise shiftable shaft mounted on the frame, gear connections that join the lengthwise shiftable shaft and the tractor wheel driving shaft, a gear loosely mounted on the shiftable shaft, a gear on the aforesaid second driving shaft that engaged the said loosely mounted gear, means connecting the aforesaid second driving shaft and the reciprocable member for imparting motion to the said member and a clutch connection for locking the loosely mounted gear to turn with the shiftable transmission, whereby to transmit motion to the second driving shaft.

5. In a farm tractor, the combination with a bed frame, steering wheels and tractor wheels upon which the said frame is supported, a motor actuated driving gear and a worm drive gear on the tractor wheels driving shaft; of power transmission comprising a main shaft that extends lengthwise of, is mounted on the frame and is longitudinally shiftable with respect to the motor driven gear, a pair of transmission gears mounted on the shaft, either of which is shiftable into engagement with the said motor driven gear, a worm gear connection between the said shiftable transmission and the worm gear on the tractor wheel shaft, whereby the said shiftable shaft is held under end thrusts for a tight frictional engagement with the motor driven gear under either of its shiftable adjustments and means for effecting the endwise adjustment of the said shiftable shaft.

6. In a farm tractor, the combination with a bed frame, steering wheels and tractor wheels upon which the said frame is supported, a motor actuated driving gear and a worm drive gear on the tractor wheels driving shaft; of power transmission comprising a main shaft that extends lengthwise of, is mounted on the frame and is longitudinally shiftable with respect to the motor driven gear, a pair of transmission gears mounted on the shaft, either of which is shiftable into engagement with the said motor driven gear, a worm gear connection between the said shiftable transmission and the worm gear on the tractor wheel shaft, whereby the said shiftable shaft is held under end thrusts for a tight frictional engagement with the motor driven gear under either of its shiftable adjustments and means for effecting the endwise adjustment of the said shiftable shaft, a second driving shaft, worm gear connections joined with the said second shaft and clutch mechanism on the shiftable shaft for locking the said worm gear connection to turn with the said shiftable shaft, whereby to actuate the aforesaid second driving shaft.

FRED JUDSON.

Witnesses:
J. T. RUSSELL,
EVERETT C. WILSON.